(12) United States Patent
Fontaine et al.

(10) Patent No.: US 10,939,374 B2
(45) Date of Patent: Mar. 2, 2021

(54) METHOD AND APPARATUS FOR REMOTELY WAKING UP A DEVICE CONNECTED TO A NETWORK

(71) Applicant: Orange, Paris (FR)

(72) Inventors: Fabrice Fontaine, Chatillon (FR); Elisabeth Lepoil, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/338,406

(22) PCT Filed: Sep. 29, 2017

(86) PCT No.: PCT/FR2017/052664
§ 371 (c)(1),
(2) Date: Mar. 29, 2019

(87) PCT Pub. No.: WO2018/060648
PCT Pub. Date: Apr. 5, 2018

(65) Prior Publication Data
US 2019/0253971 A1    Aug. 15, 2019

(30) Foreign Application Priority Data

Sep. 30, 2016 (FR) ...................................... 1659430

(51) Int. Cl.
*H04W 52/02* (2009.01)
*H04L 12/12* (2006.01)
(Continued)

(52) U.S. Cl.
CPC ......... *H04W 52/0229* (2013.01); *H04L 12/12* (2013.01); *H04L 61/2015* (2013.01);
(Continued)

(58) Field of Classification Search
CPC ............. H04W 52/0229; H04W 52/02; H04W 52/0203; H04L 61/2015; H04L 12/12; H04L 61/6022; Y02D 50/40; G06F 1/26
See application file for complete search history.

(56) References Cited

U.S. PATENT DOCUMENTS

| 8,411,628 B2 * | 4/2013 | Eronen | ............. H04L 29/12528 370/329 |
| 2007/0140159 A1 * | 6/2007 | Eronen | ............. H04L 29/12009 370/328 |

(Continued)

FOREIGN PATENT DOCUMENTS

WO    WO 2007/069046 A1    6/2007

OTHER PUBLICATIONS

Kantee, Antti. "Flexible operating system internals: the design and implementation of the anykernel and rump kernels." (2012). (Year: 2012).*

(Continued)

*Primary Examiner* — Sharad Rampuria
(74) *Attorney, Agent, or Firm* — Knobbe, Martens, Olson & Bear, LLP

(57) ABSTRACT

A method of waking up a device is described. The device can be connected to a first network, comprising an access apparatus via which the device is able to access a second network. The device can include a plurality of network interfaces, and respective addresses, for communication with the access apparatus. The method can include prior storage in a memory accessible by the access apparatus of a correspondence table including a plurality of correspondences between the addresses and at least one parameter identifying the device. When the access apparatus receives a wakeup command with respect to the device, the command including an address, the addresses relating to the device are determined by cross-checking in the table, and the access (Continued)

apparatus transmits to the device at least one wakeup command including a resulting address.

6 Claims, 1 Drawing Sheet

(51) Int. Cl.
    *H04L 29/12*     (2006.01)
    *G06F 1/26*     (2006.01)

(52) U.S. Cl.
    CPC ......... *H04L 61/6022* (2013.01); *H04W 52/02* (2013.01); *G06F 1/26* (2013.01); *Y02D 30/50* (2020.08)

(56) References Cited

U.S. PATENT DOCUMENTS

| | | | |
|---|---|---|---|
| 2010/0226321 A1 | 9/2010 | Goto et al. | |
| 2015/0095680 A1 | 4/2015 | Gossain et al. | |
| 2015/0286273 A1* | 10/2015 | Tazebay | G06F 1/3209 713/323 |

OTHER PUBLICATIONS

International Search Report and Written Opinion dated Nov. 20, 2017 for Application No. PCT/FR2017/052664.

* cited by examiner

METHOD AND APPARATUS FOR REMOTELY WAKING UP A DEVICE CONNECTED TO A NETWORK

RELATED APPLICATIONS

This application is the U.S. National Phase of Application No. PCT/FR2017/052664 entitled "METHOD AND APPARATUS FOR REMOTELY WAKING UP A DEVICE CONNECTED TO A NETWORK" and filed Sep. 29, 2017, which claims the benefit of French Patent Application No. 1659430, filed Sep. 30, 2016, each of which is incorporated by reference in its entirety.

TECHNICAL FIELD

The invention relates to the field of telecommunications and more particularly to a method and apparatus for waking up a device connected to a network.

PRIOR ART

A known technique for waking up a device in a domestic local network (LAN, for "Local Area Network" in English) is to use a so-called Wake-on-LAN (WoL) or Wake on Wireless LAN (WoWLAN) technique depending on whether the device is connected wirelessly with an access apparatus, such as a domestic gateway, for example by Wi-Fi, or with a wire for example an Ethernet cable.

These two techniques make it possible to wake up a device which has previously gone on standby (suspend-to-ram or suspend-to-disk) by dispatching a packet in broadcast mode (broadcast in English), called a "magic packet" by the person skilled in the art, on the LAN network. On receipt of this packet, the device wakes up.

Also, the devices of the local network can communicate with an access apparatus via an interface chosen from among several available interfaces. For example a decoder can communicate with an access apparatus via an Ethernet interface or via a Wi-Fi interface, by choice.

In this configuration, at an instant t, the decoder is connected with the access apparatus either by Ethernet with a first private address @MAC1, or by Wi-Fi with a second private address @MAC2.

Recall that the access apparatus is interposed between the LAN network and another network, for example a WAN (English acronym of Wide Area Network) or a 3G or equivalent mobile network.

In certain configurations, at the level of the WAN network, in particular of the service platforms, only an interface address is transmitted to the platforms for example the first @MAC1 to identify the decoder. Consequently, the decoder can be woken up from the platforms only by way of the address @MAC1 via the Ethernet interface. However, it may happen that the interface currently in use when the wakeup request is received (for example the Wi-Fi interface) is the Wi-Fi interface; in this configuration, the device may not be woken up.

The invention offers a solution that does not exhibit the drawbacks of the prior art.

THE INVENTION

To this effect, according to a functional aspect, the subject of the invention is a method for waking up a device connected to a first network comprising an access apparatus via which the device is able to access a second network, the device comprising a plurality of network interfaces and respective addresses, for communication with the access apparatus, characterized in that it comprises a step of prior storage in a memory accessible by the access apparatus of a plurality of correspondences, termed correspondence table, between the addresses and at least one parameter identifying the device, and in that it comprises, when the access apparatus receives a wakeup command in respect of the device, the command including an address,
  a step of cross-referencing in the table so as to determine the addresses linked with the address received;
    a step of transmission from the access apparatus destined for the device of at least one wakeup command including an address resulting from the cross-referencing step.

According to the invention, the access apparatus has access to a memory in which are stored the addresses linked with all or some of the communication interfaces able to be used on a device to be woken up. Subsequent to the obtaining of the addresses, a wakeup request sent by the access apparatus destined for the device will assuredly lead to the waking up of the device regardless of the address received from the first network and regardless of the interface currently in use on the device to be woken up.

The invention guarantees the remote waking up of a device having several interfaces, and therefore several private addresses, on the basis of a single private address sent from a service platform. In other words, if the interface used on the device is a first interface (for example the Wi-Fi interface) and if the wakeup request received by the access apparatus relates to the second interface (for example the Ethernet interface), the access apparatus will be able to wake up the device by retrieving the address linked with the first interface by cross-referencing.

According to a first particular mode of implementation of the invention, during the transmission step, several wakeup commands are transmitted, the commands including the addresses resulting from the cross-referencing step. In this mode, the command is transmitted to all the interfaces, active or inactive. This mode of implementation of the invention guarantees that the wakeup request will be received by the right interface, namely the active interface.

According to a second particular mode of implementation of the invention, which will be able to be implemented alternatively or cumulatively with the previous one, the access apparatus stores the address of the last interface used; and during the transmission step, a wakeup command is transmitted with this address if the latter results from the cross-referencing step. In this second mode, a single wakeup command is transmitted unlike in the first mode in which several commands are transmitted "blindly", that is to say without seeking to determine which interface is currently in use on the device to be woken up.

According to yet another particular mode of implementation of the invention, which will be able to be implemented alternatively or cumulatively with the previous ones, the access apparatus stores a history of the interfaces used as a function of time, in that the address of the device to be woken up is determined as a function of the current time; and in that a wakeup command is transmitted with this address if the latter results from the cross-referencing step. As in the second mode, a single wakeup command is transmitted unlike in the first mode in which several commands are transmitted blindly.

The advantage of the latter two modes is to reduce the number of wakeup commands to be transmitted in the local network to the device to be woken up.

According to a hardware aspect, the invention pertains to an access apparatus which is interposed between a first network comprising a device, and a second network, the device comprising a plurality of network interfaces and respective addresses for communication with the access apparatus, characterized in that it comprises:

an access module able to access a plurality of correspondences, termed correspondence table, between the addresses and at least one parameter identifying the device, a module for receiving a wakeup command in respect of the device, the command including an address, a module for cross-referencing in the table so as to determine addresses linked with the address received and relating to the device to be woken up;

a transmission module able to transmit from the access apparatus destined for the device at least one wakeup command including an address resulting from the cross-referencing step.

This access apparatus can of course comprise in structural terms the various characteristics, which can be combined or taken in isolation, relating to the detection method such as described previously. Thus, the advantages stated in respect of the detection method according to the first aspect are transposable directly to the user apparatus. Consequently, they are not detailed more fully.

According to another hardware aspect, the invention deals with a program for an access apparatus, comprising program code instructions intended to control the execution of the hereinabove described steps of the detection method which are implemented by the apparatus, when said program is executed by said apparatus.

According to another hardware aspect, the invention deals with a recording medium readable by a user apparatus on which is recorded the program described hereinabove.

The advantages stated in respect of the detection method according to the first aspect are transposable directly to the program for a user apparatus and to the recording medium.

The invention will be better understood on reading the description which follows, given by way of example and with reference to the appended drawings in which.

DETAILED DESCRIPTOPM OF AN (OR OF) EXEMPLARY EMBODIMENT(S) ILLUSTRATING THE INVENTION

The invention is applicable to any device accessing a network, whether this device be a computer terminal, an IP telephone, an electrical meter, a home-automation device, etc. The invention will however be described in the case of its application to the remote waking up of a terminal of digital television decoder type. In our example, this decoder has in particular a function of recording contents on a hard disk which is present on the decoder or on a disk of the communication network with which it can communicate.

Waking up a device consists in rendering it active whilst it is in an inactive state, for example because it is in a state of prolonged or temporary standby. The aim of this activation or enabling is to allow this device to be used.

Figure 1:
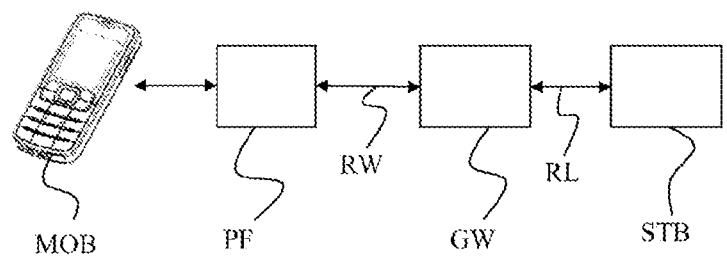
FIG. 1 represents a computer system on which an exemplary embodiment of the invention is illustrated.

A communication system appropriate to the implementation of the invention is represented in FIG. 1. This system comprises:

a decoder STB able to be on standby and having several communication interfaces for communicating in particular with an access apparatus GW described hereinbelow; in our example, the decoder has two interfaces and therefore two private addresses:

with a first private address @MAC1 for the first interface, for example an Ethernet interface;

with a second address @MAC2 for the second interface interface, for example a Wi-Fi interface."

an access apparatus GW for access to a network RW, and able to manage a local network (LAN network, Local Area Network) RL allowing the decoder STB hooked up to the local network RL to access the network RW or to be accessible through this network RW;

a first telecommunication network RW, in the form of a wide area network (WAN network, Wide Area Network), for example the Internet network;

a platform PF accessible via the network RW; this platform will not be described in detail since it is not relevant to the disclosure of the invention. This platform may be a computer or a server or indeed a plurality of computers or servers communicating with one another; the assumption is made that this platform knows a single private address of the decoder STB for example @MAC1. The function of this platform is, among others, on receipt of a wakeup request, to implement the waking up of the decoder STB in question. It is therefore understood here that the platform can request the waking up of the decoder STB only by way of the address @MAC1 since it does not know the second address @MAC2. On receipt of a query WR(STB) relating to the decoder STB, the platform PF will send a wakeup request with the address @MAC1 as parameter.

Recall here that an address @MAC (English acronym of "Media Access Control") is a physical address of the decoder in the local network RL.

The access point GW has the hardware architecture of a conventional computer. It comprises in particular a processor, a random-access memory of type and a read-only memory in which is recorded a computer program in accordance with the invention, this program comprising instructions for executing the steps of the method described with reference to FIG. 4.

Figure 2:
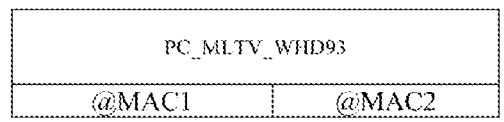
FIG. 2 illustrates a data packet called a "magic" packet used to wake up a device.

FIG. 2 illustrates a packet, called a "magic packet" by the person skilled in the art. This packet contains bytes (FF FF FF FF FF FF) representative of a "Broadcast" address, followed by an address, for example the address @MAC1, of the decoder to be woken up; this address is repeated 16 times; the magic packet can also include a password for example of four or six bytes.

Figure 3:
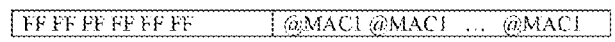
FIG. 3 is schematic view of a table envisaged hereinabove.

FIG. 3 illustrates a table in which is stored at least one correspondence between a device identifier, in our example an identifier of the decoder PC_MLTV_WHD93 and the addresses @MAC1 @MAC2 able to be used by the decoder to communicate through the access apparatus. The exemplary embodiment illustrated with reference to FIG. 4, hereinbelow, describes examples of obtaining such a correspondence table.

Figure 4:
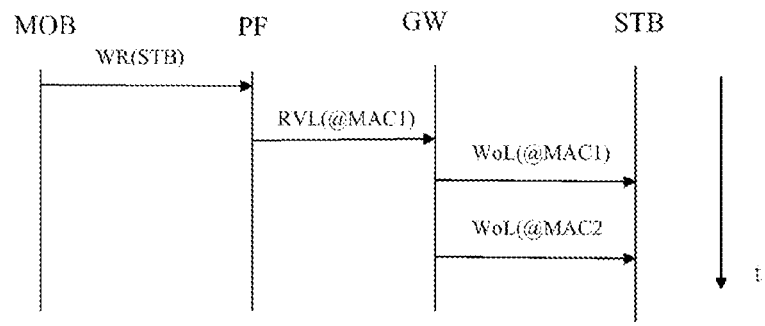
FIG. 4 illustrates the steps of a wakeup method according to one embodiment of the present invention.

An exemplary embodiment will now be described with reference to FIG. 4. In this figure are represented protocol exchanges with their evolution over time. Four axes are associated respectively with the mobile MOB, with the platform PF, with the access apparatus GW and with the decoder STB.

During a first phase (not represented in FIG. 4), upon connection of a device at the IP level, the access apparatus, being the DHCP router, the latter will, over time, receive DHCP queries from the decoder via the various network interfaces of this device. In particular, it will receive a DHCP query from the decoder STB via the Ethernet interface when the Ethernet interface is used and via the Wi-Fi interface when the Wi-Fi interface is used.

At this juncture, with reference to FIG. 2, the access apparatus creates correspondences between private addresses of the decoder in the local network and an identifier of the decoder STB; the apparatus thereafter stores these correspondences, for example in the table form (cf. FIG. 3), for subsequent use during a second phase.

In our example, the identifier is chosen from among the identifiers used in a DHCP query and preferably invariable for one and the same device regardless of the interface used. For example, in this DHCP query, a field designated by "Option 77 (UserClassID)" is the same regardless of the interface used on the decoder. For example, for the decoder STB, UserClassID will always have the same value; for example PC_MLTV_WHD93.

Ultimately, the access apparatus stores correspondences such as:

---
@MAC1/ PC_MLTV_WHD93
@MAC2/ PC_MLTV_WHD93
---

Other invariable parameters can very obviously be used such as for example a field named "hostname" provided by the decoder in its DHCP query. Let us assume that this field has the value "decoder TV 4". In this configuration the access apparatus stores the correspondences ---
@MAC1/ PC_MLTV_WHD93/decoder TV 4
@MAC2/ PC_MLTV_WHD93/decoder TV 4
---

The chosen identifier may also be variable but sufficient to deduce that they originate from the same device.

Instead of being created automatically, the table can also be created by a user. Accordingly, the user uses for example a computer connected to the access point and stores in the memory of the access point the table in question. The identifier can also be entered by a user; for example, the user can enter an identifier on the access apparatus administration interface.

It is understood here that by cross-referencing between existing correspondences, namely in our example ---
@MAC1/ PC_MLTV_WHD93/decoder TV 4
@MAC2/ PC_MLTV_WHD93/decoder TV 4
--- the access apparatus can interlink all or some of the private addresses @MACi (i is an integer) relating to one and the same device. Indeed, having a corresponding opposite party of the type A/B and a correspondence of the type A/C (A,B,C being any values), it is deduced by cross-referencing or by transitivity that A/B/C are linked. Recall that a transitive relation is a binary relation for which a series of objects (identifiers, addresses, etc.) related consecutively culminates in a relation between the first and the last.

In our example, it is deduced that PC_MLTV_WHD93 (or decoder TV) is linked with the address @MAC1 and with the address @MAC2 and that therefore the addresses @MAC1 and @MAC2 relate to the same device, namely the decoder STB.

Note that the correspondences are stored in a memory; this memory may be the read-only memory of the access apparatus GW or a memory external to the access apparatus GW.

During a second phase, a remote device, the mobile MOB in our example, will wish to wake up the decoder STB for example to record a content on its decoder.

This second phase comprises several steps described hereinbelow.

During a first step, the mobile MOB sends a recording command WR(STB) in respect of an arbitrary digital content. In our example this content is a televised content.

This command is received during a second step by the platform PF offering a content recording service. The platform identifies the access apparatus concerned. In our example, as indicated previously, the platform stores only a private address of the decoder STB, for example the address @MAC1, on the two existing ones. Note that the platform could store other private addresses relating to the same device, other than the address @MAC2.

During a third step, the platform knowing the IP address of the access apparatus sends a wakeup command RVL (@MAC1) including the address @MAC1 of the decoder, or indeed other addresses with reference to the second step, with the exception of the address @MAC2.

During a fourth step, the access apparatus GW receives the wakeup command; subsequent to reception, the access apparatus extracts the address @MAC1; subsequent to extraction, the access apparatus consults the correspondence table and retrieves all the private addresses of the same device by virtue of the correspondence table.

In our example, having all the addresses of the decoder, namely @MAC1 and @MAC2, during a fifth step, the access apparatus GW sends at least one wakeup command WoL.

Several variants are possible for carrying out this fifth step.

A first variant consists in the access apparatus sending a wakeup command via the various possible communication links with the decoder, in our example at one and the same time on the Wi-Fi link and on the Ethernet linkup. This first variant is manifested by the dispatching of several wakeup commands, the commands including the addresses resulting from the cross-referencing step, namely @MAC1 and @MAC2. This variant guarantees that the decoder will receive the wakeup command WOL on the interface currently in use; the command WOL dispatched on the non-used link is not received by the decoder.

The access apparatus thereafter receives a DHCP query on the part of the decoder via the interface used.

Two other variants are also possible and have the advantage of limiting the number of wakeup commands WoL in the local network RL.

According to a second variant, it is assumed that the access apparatus has access to a memory in which what was the last address used, for example @MAC2, is stored. If the address received by the access apparatus is not the same address, the access apparatus carries out a cross-referencing by virtue of the correspondences and if the stored address @MAC2 results from the cross-referencing step, a command is sent to the decoder with the address @MAC2.

According to a second variant, the access point stores a history of the interfaces used as a function of time. In this configuration, the address of the decoder to be woken up is determined as a function of the current time and of this history; once the address has been determined, a command is sent to this interface. For example, if the Wi-Fi interface is often used in the evening from 18 h to 20 h, the address used in the wakeup command will be the address @MAC2 linked with the Wi-Fi interface; if the interface used between 8 and 12 h is the Ethernet interface, the address used will be the address @MAC1 linked with the Ethernet interface. Also, instead of being entered automatically as a function of the use made of the decoder, the history can also be entered manually by a user.

Note that to carry out the method, the access point GW is equipped with modules as follows:
- an access module able to access a plurality of correspondences, termed correspondence table, between the addresses and at least one parameter identifying the device,
- a module for receiving a a wakeup command in respect of the device, the command including an address (@MAC2),
- a module for cross-referencing in the table so as to determine addresses relating to the device;
- a transmission module able to transmit from the access apparatus destined for the device at least one wakeup command including an address resulting from the cross-referencing step.

The term "module" can correspond in this document either to a software component, or to a hardware component or to a set of hardware components and/or software components, able to implement a function or a set of functions.

A software component corresponds to one or more computer programs, one or more subprograms of a program, or more generally to any element of a program or item of software. Such a software component is stored in memory and then loaded and executed by a data processor of a physical entity and is able to access the hardware resources of this physical entity (memories, recording media, communication buses, electronic input/output cards, user interfaces, etc).

In the same way, a hardware component corresponds to any element of a hardware assembly. It may or may not entail a programmable hardware component, with or without integrated processor for software execution. It entails for example an integrated circuit, a chip card, an electronic card for the execution of firmware, etc.

The invention claimed is:

1. A method of waking up a device connected to a first network comprising an access apparatus configured to allow the device to access a second network, the device comprising a plurality of network interfaces and respective addresses for communication with the access apparatus, the method comprising:
   storing in a memory accessible by the access apparatus a plurality of correspondences between the addresses in a correspondence table and an address of the last interface used; and
   when the access apparatus receives a wakeup command in respect of the device, the command including an address:
   determining, by cross referencing in the correspondence table, a plurality of resulting addresses linked with the address included in the command;
   transmitting, from the access apparatus to the device, a plurality of device wakeup commands including the plurality of resulting addresses, one of the plurality of device wakeup commands including the address of the last interface used if the address of the last interface used results from the cross-referencing in the correspondence table.

2. The method of claim, wherein the memory stores a history of the interfaces used as a function of time, wherein an address of the device to be woken up is determined as a function of the current time and the history of the interfaces used as a function of time, and wherein one of the plurality of device wakeup with includes the determined address if the determined address results from the cross-referencing step.

3. The method of claim 1, further comprising, prior to storing a plurality of correspondences between the addresses in a correspondence table, receiving a query for recording of the device, the query including the address of the device and at least one parameter identifying the device.

4. An access apparatus interposed between a first network comprising a device, and a second network, the device comprising a plurality of network interfaces and respective addresses for communication with the access apparatus, wherein the access apparatus is configured to:
   access a correspondence table including a plurality of correspondences between the addresses;
   receive a wakeup command with respect to the device, the command including an address; determine a plurality of resulting addresses linked with the address included in the command by cross-referencing in the correspondence table; and
   transmit from the access apparatus to the device a plurality of device wakeup commands including the plurality of resulting addresses, wherein the access apparatus stores an address of the last interface used, and wherein one of the plurality of device wakeup commands includes the address of the last interface used if the address of the last interface used results from the cross-referencing in the correspondence table.

5. A non-transitory computer readable medium having stored thereon instructions which when executed by a processor cause the processor to implement the method of claim 1.

6. A computer comprising a processor and a memory and having stored thereon instructions, which when executed by the processor of the computer cause the computer to implement the method of claim 1.

* * * * *